United States Patent
Chowdhuri et al.

(10) Patent No.: US 9,705,985 B1
(45) Date of Patent: Jul. 11, 2017

(54) SYSTEMS AND METHODS FOR CROSS PROTOCOL AUTOMATIC SUB-OPERATION SCHEDULING

(71) Applicant: Marvell International Ltd., Hamilton (BM)

(72) Inventors: Bhaskar Chowdhuri, San Diego, CA (US); Pantas Sutardja, Los Gatos, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 268 days.

(21) Appl. No.: 14/210,893

(22) Filed: Mar. 14, 2014

Related U.S. Application Data

(60) Provisional application No. 61/803,002, filed on Mar. 18, 2013.

(51) Int. Cl.
H04L 29/08 (2006.01)

(52) U.S. Cl.
CPC ................................ H04L 67/1097 (2013.01)

(58) Field of Classification Search
CPC .................................................. H04L 67/1097
See application file for complete search history.

(56) References Cited

U.S. PATENT DOCUMENTS

| | | | |
|---|---|---|---|
| 7,500,241 B1* | 3/2009 | Flockhart | G06F 9/4881 718/100 |
| 2005/0268300 A1* | 12/2005 | Lamb | G06F 9/5038 718/100 |
| 2007/0276934 A1* | 11/2007 | Lai | H04L 67/1002 709/223 |
| 2009/0254919 A1* | 10/2009 | Jayaraman | G06F 9/44563 718/108 |
| 2010/0115521 A1* | 5/2010 | Morisada | G06F 9/5072 718/102 |
| 2010/0242014 A1* | 9/2010 | Zhu | G06F 8/451 717/106 |
| 2010/0257316 A1* | 10/2010 | Arimilli | G06F 9/30101 711/119 |
| 2011/0161974 A1* | 6/2011 | Kurabayashi | G06F 9/5066 718/104 |

(Continued)

*Primary Examiner* — Meng An
*Assistant Examiner* — Jorge A Chu Joy-Davila

(57) ABSTRACT

Systems and methods are provided for executing multiple processes that share common sub-operations. A processor cluster is configured to execute sub-operations of the multiple processes. The processor cluster includes a database configured to store records containing parameters of sub-operations associated with a first process and sub-operations associated with a second process, the records storing dependencies among sub-operations. A processor cluster includes plurality of processors. A ready sub-operation repository is configured to identify sub-operations that are ready to be performed. A sub-operation launcher is configured to select a sub-operation from the ready sub-operation repository and assign the selected sub-operation to one of the plurality of processors, and a sub-operation initiator is configured to update the ready sub-operation repository based on completion of a sub-operation by an assigned processor, the sub-operation initiator being configured to update identifications of sub-operations that depend on the completed sub-operation.

19 Claims, 7 Drawing Sheets

(56) References Cited

U.S. PATENT DOCUMENTS

| | | | |
|---|---|---|---|
| 2012/0040670 A1* | 2/2012 | Chin | H04W 60/005 455/435.1 |
| 2012/0222038 A1* | 8/2012 | Katragadda | G06F 9/5044 718/104 |
| 2013/0160016 A1* | 6/2013 | Gummaraju | G06F 9/5044 718/102 |
| 2014/0068621 A1* | 3/2014 | Sitaraman | G06F 9/505 718/102 |
| 2015/0046929 A1* | 2/2015 | Kumar | G06F 9/547 718/106 |

* cited by examiner

| Field | Field Description |
|---|---|
| Node Number | Specifies the node number. If nodes are stored in a table then this is an implied field which corresponds to the node's position in the graph node table. |
| Processor Class | Describes what kind of processor is required for running the node function. Example processor class are ADC, FFT, Viterbi, etc. |
| Process Function | For processor that can do multiple functions this field specifies exactly what function to run. Example an FFT unit may be capable of doing 128 as well as 64 point FFT. This field would specify what type of FFT to compute. For single function processors this value is irrelevant. |
| Priority | If multiple nodes are ready to run for a processor class and their number is more than available processors then this field is used to decide which node is run first. |
| Expiry time | Specifies a time limit (from the start of current data sequence) by which the node function must execute for the current sequence must be executed. The sequence start time is recorded when a data set is produced by the root node. This information is used as dynamic priority in conjunction with priority field described earlier. This field is also used for error reporting and recovery. |
| Number of inputs | Number of input archs to the graph node. |
| Number of outputs | Number of output archs from the graph node. This number is also referred as N |
| Number of dependent | Number of nodes that depend on the output generated by this node. This number is also referred as M |
| Output Buffer Info [0..N] | For each output data block produced by the node function there is an associated output buffer. This field contains the following information for that buffer. |
| | Allocation Type | Indicates what kind of memory space should be used in the shared memory for this buffer. |
| | Size Class | Describes what size of buffer should be used for this output |
| Dependent Info [0..M] | To describe each dependency of the node (represented by archs going out from the node) following information are required |
| | Destination Node Number | Arch's destination node number |
| | Source Output Index | Which output data set to be forwarded |
| | Destination Input Index | Which input in the destination node the data set corresponds to. |

FIG. 3

SYSTEMS AND METHODS FOR CROSS PROTOCOL AUTOMATIC SUB-OPERATION SCHEDULING

CROSS-REFERENCE TO RELATED APPLICATIONS

The present application claims priority from U.S. Provisional Application Ser. No. 61/803,002 entitled "Dataflow Processor with Automatic Scheduling for Implementation of Multiple Radio Applications," filed 18 Mar. 2013, the entirety of which is hereby incorporated by reference.

FIELD

This disclosure is related generally to data processing and more particularly to automatic scheduling of process sub-operations.

BACKGROUND

Utilization of dedicated hardware can result in fast processing speeds, where that dedicated hardware can be optimized to quickly perform particular functions and is always available for performing those particular functions. Using dedicated processing hardware can, however, be expensive in both component monetary cost and fabrication space cost. In certain design scenarios, those costs can outweigh the benefits of utilizing dedicated hardware, such that a hardware sharing framework is more desirable.

SUMMARY

Systems and methods are provided for executing multiple processes that share common sub-operations. A processor cluster is configured to execute sub-operations of the multiple processes. The processor cluster includes a database configured to store records containing parameters of sub-operations associated with a first process and sub-operations associated with a second process, the sub-operations associated with the first process sharing a common sub-operation with the sub-operations associated with the second process, the records further storing dependencies among sub-operations. A processor cluster includes a plurality of processors, where a particular processor is of a particular type that is configured to perform a particular sub-operation that is common to the first process and the second process. A ready sub-operation repository is configured to identify sub-operations that are ready to be performed. A sub-operation launcher is configured to select a sub-operation from the ready sub-operation repository and assign the selected sub-operation to one of the plurality of processors, and a sub-operation initiator is configured to update the ready sub-operation repository based on completion of a sub-operation by an assigned processor, the sub-operation initiator being configured to update identifications of sub-operations that depend on the completed sub-operation.

As another example, a method of executing multiple processes that share common sub-operations includes performing a first sub-operation of a first process using a first processor of a plurality of processors in a first processor cluster and storing a result of the first sub-operation in a shared memory. A database configured to store records containing parameters of sub-operations associated with the first process and sub-operations associated with the second process is accessed, the sub-operations associated with the first process sharing a common sub-operation with the sub-operations associated with the second process, the records further storing dependencies among sub-operations. A second sub-operation is determined that depends on the first sub-operation using records from the database, the second sub-operation being configured to use the result of the first sub-operation as an input. A ready sub-operation repository is updated based on the determined second sub-operation, the ready sub-operation repository being configured to identify sub-operations that are ready to be performed. The second sub-operation is selected from the ready sub-operation repository and assigned the second sub-operation to one of the plurality of processors in the first processor cluster. The result of the first sub-operation is accessed from the shared memory, and the second sub-operation is performed using the assigned processor and the accessed result.

BRIEF DESCRIPTION OF THE DRAWINGS

FIG. 3 is a diagram depicting one framework for tracking processes to be performed by processor clusters.

DETAILED DESCRIPTION

Figure 1:
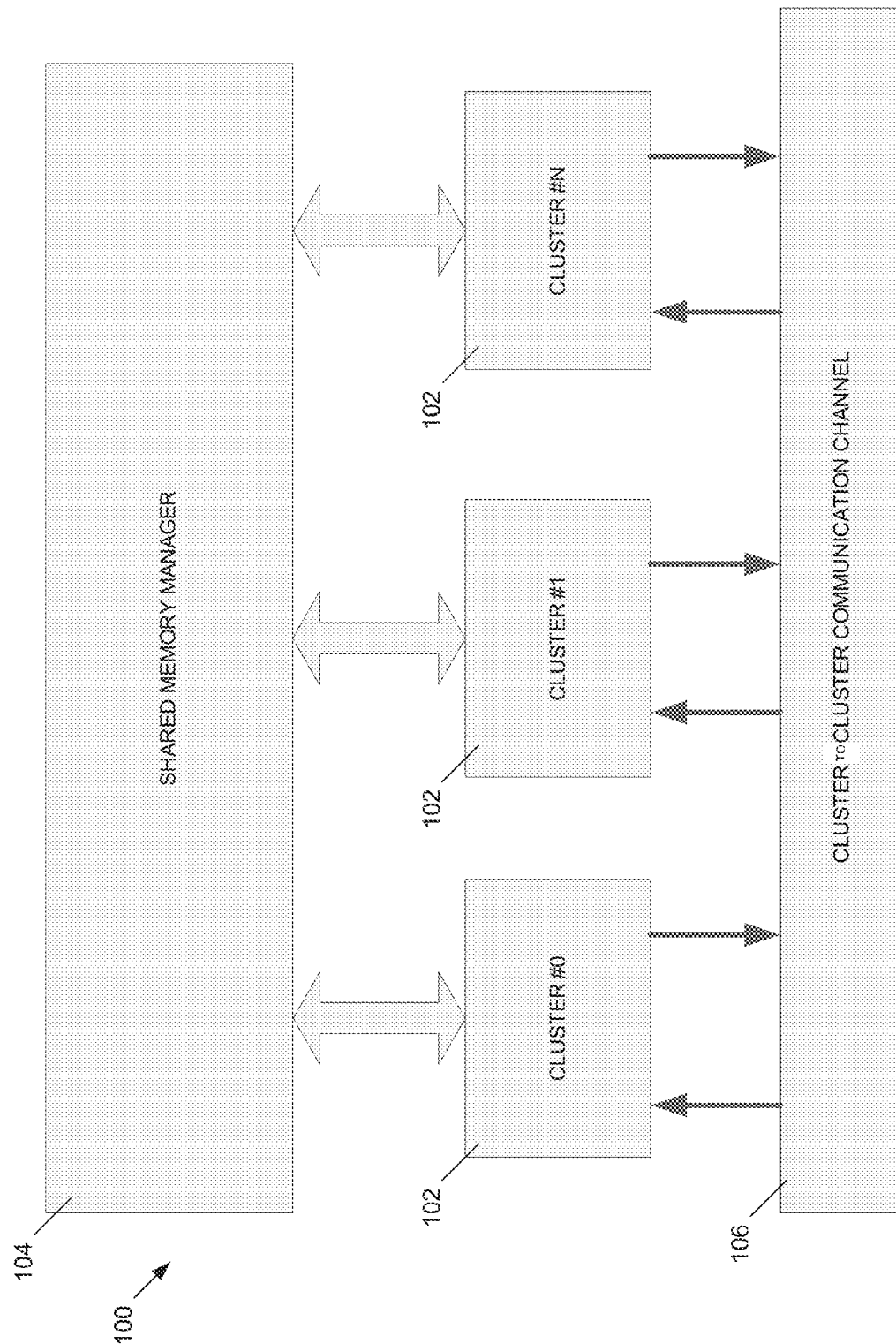
FIG. 1 is a diagram depicting a system for executing multiple processes that share common sub-operations.

FIG. 1 is a diagram depicting a system for executing multiple processes that share common sub-operations. The system 100 includes a plurality of processor clusters 102 configured to execute sub-operations of the multiple processes. Each of the processor clusters 102 includes a plurality of data processors, with different data processor types being present across the multiple processor clusters 102. The processor clusters 102 are configured to store results from executing sub-operations of the multiple processes in a shared memory 104, where multiple processor clusters can access results stored in the shared memory 104. In this way, processor clusters 102 can share sub-operation execution results with other processor clusters, such as other processor clusters tasked with executing downstream sub-operations of a process that rely on the stored results. The processor clusters 102 are configured to communicate with one another via messages communicated on a cluster to cluster communication channel 106.

The system depicted in FIG. 1 can be implemented in a variety of contexts, including in scenarios where multiple processes that share common sub-operations are to be executed. The system of FIG. 1 enables sharing of processing resources across those multiple processes, offering a potential monetary cost savings as well as a fabrication space savings. In one example, the system of FIG. 1 is implemented in a modem, where data is received according to a number of different protocols (e.g., an 802.11 protocol, a Bluetooth protocol, and a long term evolution (LTE) protocol). Certain processes to be performed on that cross-protocol data, such as decoding processes, can be broken apart into component sub-operations of those processes. While certain of the sub-operations are protocol specific (e.g., analog-to-digital conversions (ADC) may be protocol specific), other sub-operations, such as fast Fourier transforms and forward error correction are often common across the protocols. Such common sub-operations that can be performed on common processors, even though those sub-operations are associated with different overarching communication protocols, offer opportunities for hardware sharing and the requisite cost and space savings.

Figure 2:
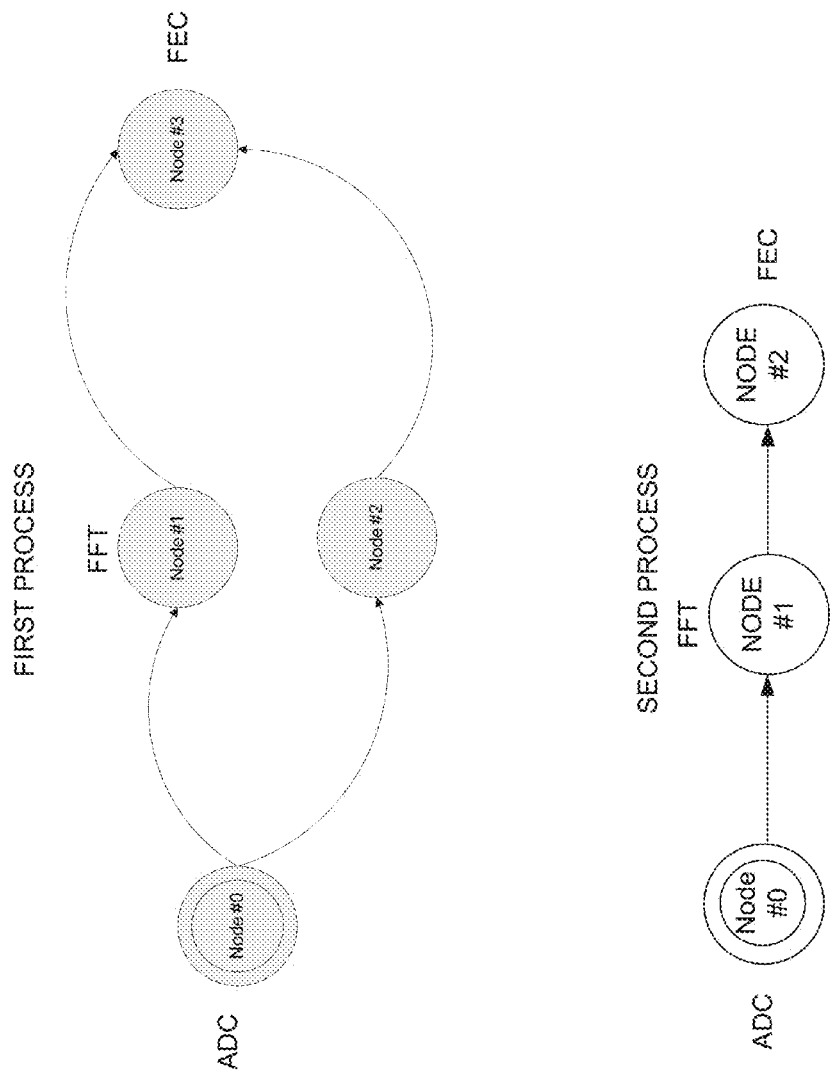
FIG. 2 is a diagram depicting two example processes that are divided into component sub-operations.

FIG. 2 is a diagram depicting two example processes that are divided into component sub-operations. A first process, such as a WiFi decoding process, includes four sub-operations, denoted by the four nodes depicted. A first sub-operation at Node 0 performs WiFi analog to digital conversion. At Node 1, a fast Fourier transform sub-operation is performed, utilizing the results from the Node 0 analog to digital conversion. Another sub-operation is performed at Node 2 that utilizes the data from the Node 0 sub-operation. The WiFi decoding process is completed at Node 3, where a forward error correction sub-operation is performed that utilizes results from both the Node 1 and Node 2 sub-operations. Thus, the forward error correction sub-operation at Node 3 depends on the preceding sub-operations and cannot start until both the Node 1 and Node 2 sub-operations are completed.

A second process, such as LTE decoding includes three sub-operations. At Node 0, LTE analog to digital conversion is performed. At Node 1, a fast Fourier transform is performed using the result from the Node 0 sub-operation, and at Node 2, forward error correction is performed on the results from the Node 1 fast Fourier transform.

Certain of the sub-operations depicted in FIG. 2 are protocol, and thus, process specific. For example, the WiFi analog to digital conversion at Node 0 of the first process is protocol specific and not useful in the LTE second process. However, certain sub-operations are common across the two processors, including the fast Fourier transforms and the forward error corrections. Thus, by designing the two processes to perform those common operations in a common fashion (e.g., operating on the same sized blocks of data), common hardware can be used to perform those sub-operations using the same algorithm, offering both a potential hardware savings and a potential programming simplification, where protocol specific software does not need to be designed for the common sub-operations.

By providing each of the processor clusters with information regarding the processes that those processor clusters will be tasked to perform (e.g., which sub-operations are to be performed, data dependencies among sub-operations), the system can be configured to automatically schedule the sub-operations to be performed by capable processors in an acceptable order. FIG. 3 is a diagram depicting one framework for tracking process sub-operations to be performed by processor clusters. In the framework of FIG. 3, each of the processor clusters includes a database configured to store node records representing parameters of sub-operations to be performed as part of a process. Each sub-operation node of a process (e.g., the nodes depicted in FIG. 2) is represented by a FIG. 3 record in the database. The database records are used to schedule and execute the sub-operations by informing the processor clusters of data dependencies among sub-operations, the tasks to be performed for particular sub-operations, the types of processors that are appropriate for performing sub-operations, as well as other information.

The sub-operation node records of FIG. 3 include a number of fields associated with a single noted sub-operation. A Node Number field acts as an index for each record. The Node Number index is utilized in a record to reference other sub-operation node records in the database (e.g., to reference a downstream sub-operation which relies on a result of the sub-operation represented by the current node record).

A processor class field identifies one or more types of processors that are appropriate for performing the sub-operation represented by the node record. The processor clusters can be populated with processors of different types. For example, certain processors may be dedicated to performing analog to digital conversion for specific protocols. Other processors may be generic digital signal processors that can be configured to perform one or more types of sub-operations. Still other processors may be configured to perform a specific sub-operation, such as forward error correction. Thus, the processor class field identifies which processors are capable of performing the sub-operation associated with the node record. Further, because each processor cluster may not include each type of processor available, the processor class field may further identify which processor clusters are capable of performing the noted sub-operation at all.

A process function field identifies the sub-operation to be performed. While certain processors may be dedicated to performing a specific sub-operation, other processors (e.g., a digital signal processor) can be configured to perform multiple sub-operations. The process function field can provide additional details as to the specific sub-operation that the node record represents (e.g., sub-operation to be performed, input block size), where the processor class field does not provide sufficient information for making that determination.

A priority field indicates a priority level associated with the sub-operation. Certain sub-operations may be deemed to be of a higher priority for a variety of reasons. For example, where a certain sub-operation has a large number of downstream sub-operations depending therefrom, that certain sub-operation may be indicated as being a high priority sub-operation that should be selected for execution before other lower priority level sub-operations. In some implementations, sub-operations that are ready to be performed are selected using a queue framework, where the first sub-operation in the queue is the first sub-operation to be taken out of the queue for execution. Where a queue structure is not informed, sub-operations that are ready to be performed (i.e., all predecessor sub-operations on which that sub-operation depends have been executed) can be selected for execution out of order, such as based on the priority field or other parameters (e.g., the number of nodes identified in the dependent info field, described in further detail below).

An expiry time field indicates the maximum time that a sub-operation can be present in a ready sub-operation repository without execution before an error event is generated. A ready sub-operation repository of a processor cluster is configured to identify sub-operations that are ready to be performed (e.g., sub-operations whose predecessor operations have been completed). If a sub-operation to be performed sits in the ready sub-operation repository for more than the expiry time, such as when a processor cluster is particularly busy, in one embodiment, that sub-operation is removed from the ready sub-operation repository and an error event is generated. The expired sub-operation can then be appropriately dealt with, such as by transferring that sub-operation to a different processor cluster (e.g., a less busy processor cluster) for execution.

Other fields of the node record indicate details of the structure of a particular process, such as the processes depicted in FIG. 2, through indications of inputs and outputs of sub-operations and dependencies among the sub-operations. A number of inputs field indicates a number of results from prior sub-operations on which the noted sub-operation depends. Once all of the inputs to the noted sub-operation have been determined (e.g., and stored in the shared memory), the noted sub-operation is ready for execution. A number of outputs field indicates the number of results (N) generated by the noted sub-operation. Each of these N results is stored, such as in the shared memory, for access by downstream sub-operations. A number of dependents field indicates the number of downstream sub-operation nodes that depend from the noted sub-operation. When the noted sub-operation completes execution, records associated those downstream sub-operations can be updated to indicate the completion of the noted sub-operation. When all sub-operations on which a downstream sub-operation relies have been executed, that downstream sub-operation is ready for execution.

An output buffer info field indicates formatting and storage destination information for results of the noted sub-operation. Each output of the noted sub-operation includes the depicted set of sub-fields in the output buffer info field. An allocation type sub-field indicates where in the shared memory space a given result of a noted sub-operation should be stored. For example, the allocation type field may indicate that the result should be stored in an area of the shared memory that can be easily accessed by a downstream sub-operation (e.g., by a particular processor cluster that will execute that downstream sub-operation). A size sub-field indicates what amount of space in the shared memory should be reserved for storing the result.

A dependent info field contains data associated with each downstream sub-operation that directly depends from the noted sub-operation. Each downstream sub-operation that directly depends on the noted sub-operation includes the depicted set of sub-fields in the dependent info field. A destination node number sub-field identifies the downstream sub-operation, such as by node number index value. A source output index sub-field indicates which of the potentially multiple outputs of the noted sub-operation the downstream sub-operation requires. A destination input index sub-field indicates to which of that downstream sub-operations inputs that required output of the noted sub-operation maps. Note, when a single downstream sub-operation requires multiple outputs from the noted sub-operation, the node record could include multiple sets of dependent info sub-fields related to that single downstream sub-operation.

The output buffer info field and the dependent info fields are variable in length depending on the number of output results of the noted sub-operation and the number of downstream sub-operations that depend on the noted sub-operation, respectively. Such variable length fields can be implemented in a variety of ways. A linked list implementation allows the fields to expand to as long as necessary. A fixed length implementation includes a number of sub-field sets that matches the worst case scenario for the field (e.g., enough sub-field sets to accommodate a sub-operation having the highest number of outputs). A hybrid implementation includes a fixed number of sub-field sets, with one of the sub-field sets being capable of storing a linked list pointer. For example, each of the output buffer info and dependent info fields can be configured to contain two fields for storing two respective sets of sub-fields. If more than two sets are needed (e.g., a sub-operation has more than two downstream sub-operations depending therefrom), then the second sub-field record contains a pointer to additional sub-field records as needed in a linked list.

Figure 4:
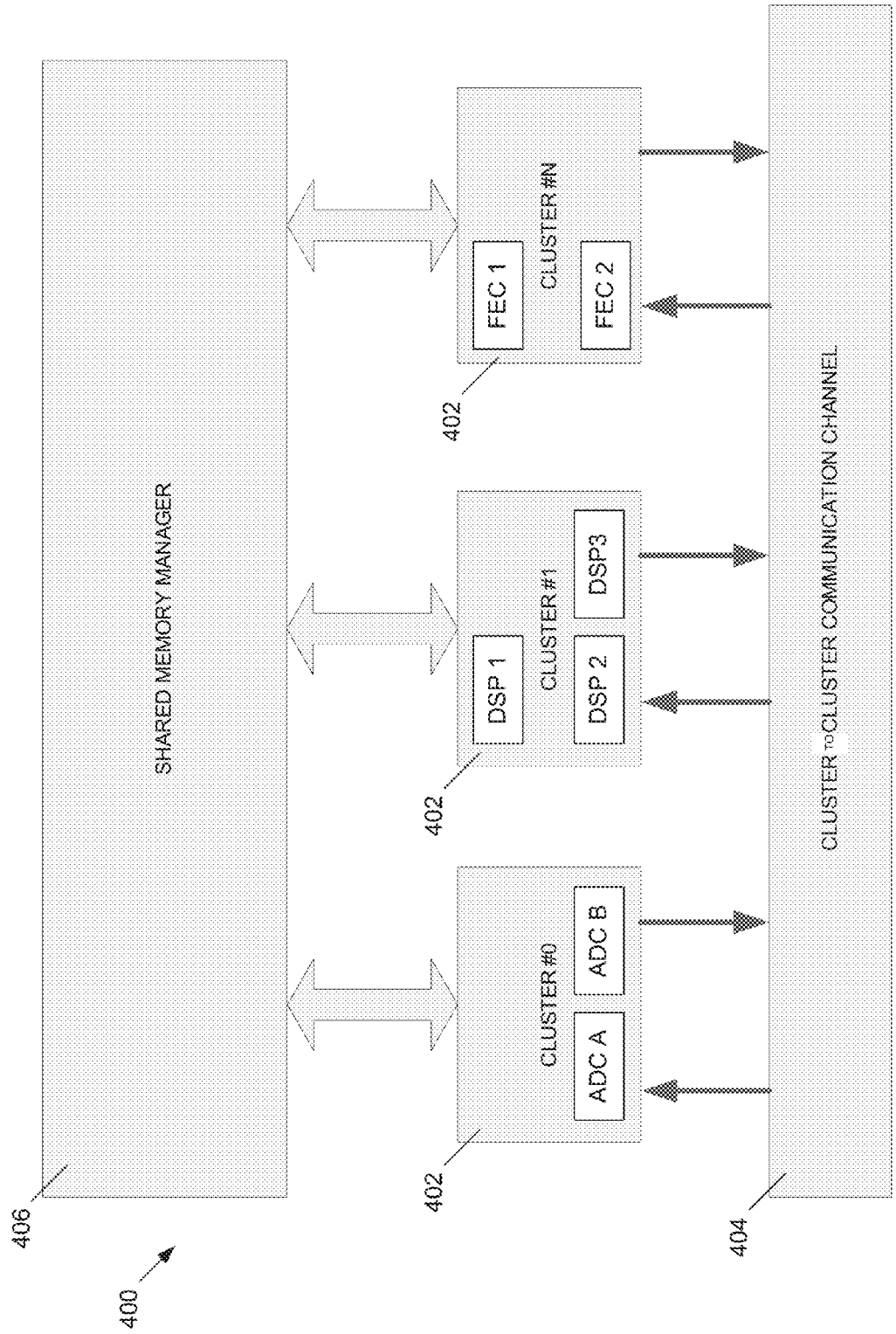
FIG. 4 is a block diagram depicting an example distribution of processors across a set of processor clusters.

FIG. 4 is a block diagram depicting an example distribution of processors across a set of processor clusters. The system 400 includes a plurality of processor clusters 402 that communicate with one another via a cluster to cluster communication channel 404, such as a communication channel that includes a plurality of queues to temporarily store messages transmitted among processor clusters 402. Processor clusters 402 can access those messages in a first come first serve manner or some other ordering scheme such as a round robin arbiter that limits the amount of consecutive messages a processor cluster 402 accesses in a row from another particular processor cluster 402. The processor clusters 402 are further responsive to a shared memory 406 for storage of sub-operation results for access by downstream sub-operations.

Each of the processor clusters 402 includes one or more individual processors. Cluster 0 includes an analog to digital converter processor for protocol A and an analog to digital converter processor for protocol B. Cluster 1 includes three digital signal processors, and cluster N includes two processors dedicated to performing forward error correction operations. The types of processors in a processor cluster 402 can limit the sub-operations that can be assigned to that processor cluster 402. For example, a fast Fourier transform sub-operation could not be assigned to cluster 0 because that cluster does not contain a processor capable of performing that sub-operation. (If a fast Fourier transform sub-operation were assigned to cluster 0, its expiry time would lapse in some embodiments, and the error handling could be configured to assign that sub-operation to a different sub-cluster.) As described in further detail with respect to FIG. 5, when adding a sub-operation to a processor queue's ready sub-operation repository, the initiating processor cluster 402 can be configured to only assign sub-operation's to processor clusters 402 that are capable of performing the sub-operation.

Figure 5:
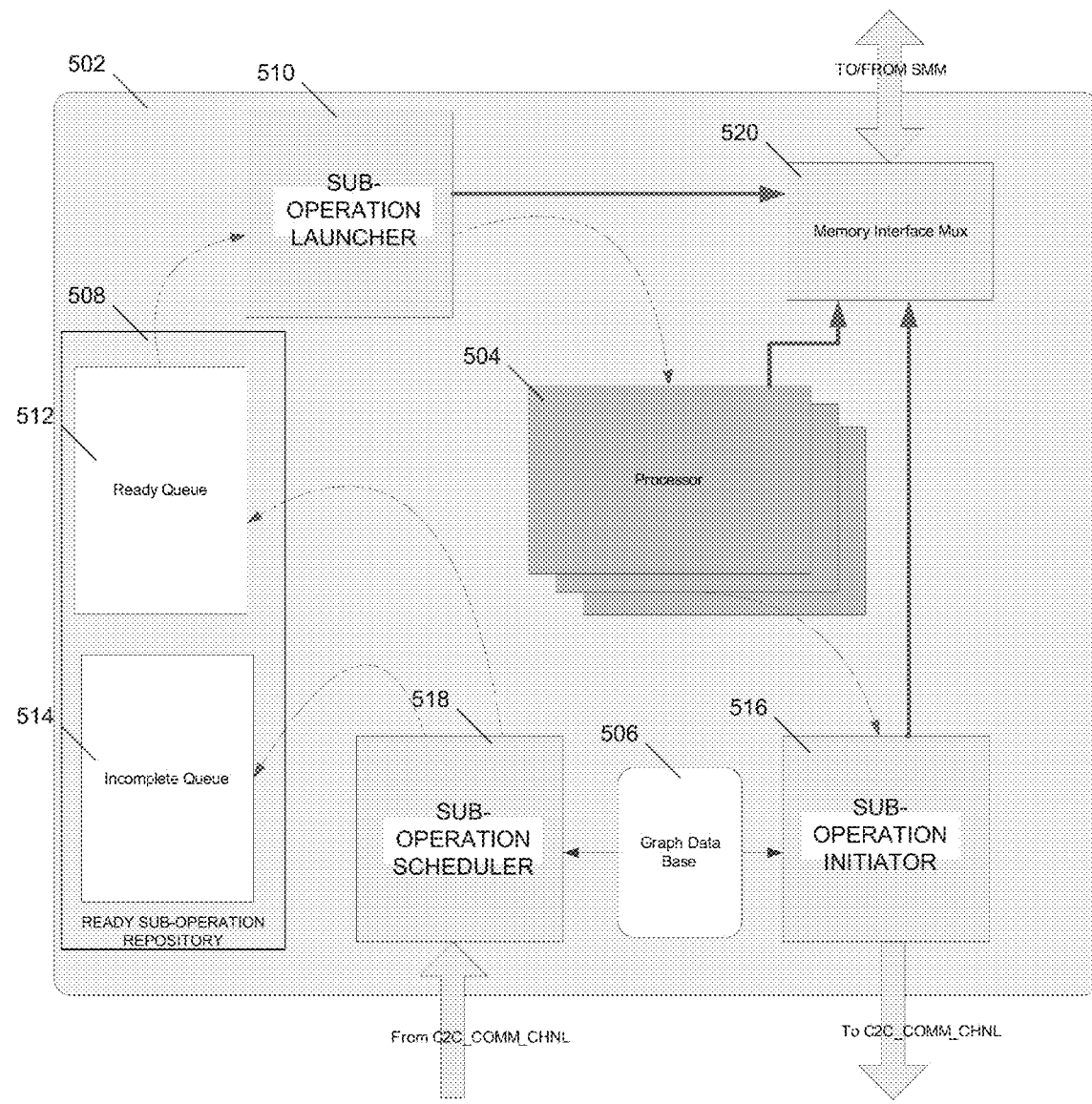
FIG. 5 is a block diagram depicting an example processor cluster.

FIG. 5 is a block diagram depicting an example processor cluster. A processor cluster 502 includes a plurality of processors 504 for performing sub-operations. For example, certain of the processors 504 may be configured to perform one or more sub-operations that are common to multiple processes, while other processors 504 may be configured to perform process specific sub-operations. The processor cluster 502 further includes a graph database 506 that stores records containing parameters of sub-operations associated with processes. As described with reference to example of FIG. 3, the records in the graph database can identify the inputs and outputs of sub-operations as well as dependencies among sub-operations that can be utilized by processor clusters 502 in scheduling sub-operation execution.

A processor cluster 502 additionally includes a ready sub operation repository 508 that contains records that identify sub-operations that are ready to be performed. A sub-operation launcher 510 is configured to select a sub-operation from the ready sub-operation repository 508 and assign the selected sub-operation to one of the plurality of processors 504. Such selection may be on a first come first serve basis, such as a queue, or selection may be on another basis such as a priorities associated with sub-operations in the ready sub-operation repository 508.

In the example for FIG. 5, the ready sub-operation repository 508 is divided into two portions, a ready queue 512 and an incomplete queue 514. Sub-operations having records in the ready queue 512 are ready for execution, where all predecessor sub-operations on which that sub-operation relies have been executed. The incomplete queue 514 contains records for sub-operations having some but not all of the predecessor sub-operations completed. In one embodiment, a sub-operation record is spawned in a ready sub-operation repository 508 whenever a first sub-operation on which it depends completes execution. The record added to the ready sub-operation repository 508 identifies data including the type of sub-operation to be performed, the type(s) of processors 504 that are capable of performing that sub-operation, and the location of inputs to that sub-operation in the shared memory from predecessor sub-operations that have completed execution. When all of the predecessor sub-operations on which the sub-operation identified by the ready sub-operation repository record have been executed, then the record is placed in the ready queue 512 portion of the ready sub-operation repository 508. When a record has been spawned, but not all of the predecessor sub-operations of the sub-operation associated with the record have been executed, the record is placed in the incomplete queue 514 until the remainder of the predecessor sub-operations have executed.

Upon completion of a sub-operation by a processor 504, a sub-operation initiator 516 is notified. The sub-operation initiator 516 is configured to update the ready sub-operation repository 508 of the processor cluster 502 or a ready sub-operation repository of a different processor cluster based on the completion of the sub-operation by the processor 504. The sub-operation initiator 516 performs its ready sub-operation repository 508 updating using data from the graph database 506. The sub-operation initiator 516 uses the graph database 506 to identify downstream sub-operations that depend on the recently completed sub-operation. Having identified the downstream dependencies, the sub-operation initiator determines if records are already present in the ready sub-operation repository 508 of the processor cluster 502 or other ready sub-operation repositories of other processor clusters via communications through the cluster to cluster communication channel.

If no records are present for a particular downstream sub-operation, then the sub-operation initiator 516 initiates creation of such a record. The sub-operation initiator 516 examines the graph database 506 record of the particular downstream sub-operation to determine what types of processors are appropriate for performing that particular sub-operation and assigns that sub-operation to one of the processor clusters that is capable of performing the particular sub-operation. The sub-operation initiator 516 may consider additional data in assigning a sub-operation to a processor cluster, such as the current operational load at different processor clusters. The sub-operation initiator 516 assigns the particular sub-operation to a processor cluster by sending a message to that processor cluster's sub-operation scheduler 518 along with an address in the shared memory of the result from the just completed sub-operation that will be utilized by the newly assigned sub-operation. The sub-operation scheduler 518 generates a record in the ready sub-operation repository 508. If the particular sub-operation is the only sub-operation on which the newly assigned sub-operation depends, then the record is placed in the ready queue 512. If the newly assigned sub-operation depends on additional sub-operations, then the record is placed in the incomplete queue 514 and waits for the additional sub-operations to be completed. An unresolved input field may be associated with the record to indicate how many additional sub-operations on which that sub-operation depends need to complete before the record can be moved to the ready queue 512.

If the sub-operation initiator 516 discovers that a record is already present for the particular downstream sub-operation, then the sub-operation initiator 516 instructs the sub-operation scheduler 518 of the processor cluster whose ready sub-operation repository 508 contains the record to update the record. The record is updated to indicate the completion of the recently completed sub-operation along with an indication of a location of the result in the shared memory. If all of the predecessor sub-operations for the particular downstream sub-operation have now been completed, then the record is moved to the ready queue 512. Otherwise, the record remains in the incomplete queue 514.

In addition to selecting sub-operations from the ready sub-operation repository 508 for assignment to a processor 504, the sub-operation launcher 510 in one embodiment is tasked with additional duties. In one implementation, when the sub-operation launcher 510 assigns a sub-operation to a processor 504, the sub-operation launcher 510 activates a clock associated with the assigned processor so that the assigned processor begins functioning until the sub-operation is complete. In such a configuration, when not executing a sub-operation, processors 504 remain in a low energy state with no active clock until a sub-operation is assigned. The sub-operation launcher, in one embodiment, is further configured to access input data from the shared memory for the sub-operation, as indicated by data from the ready sub-operation repository 508 data records and to provide that input data to the assigned processor.

In another example, the sub-operation launcher 510 facilitates allocation of memory buffers for storage of results of a selected sub-operation in the shared memory. As discussed with reference to FIG. 3, data associated with a sub-operation record can indicate an output data size as well as downstream sub-operations that will utilize the output data. The sub-operation launcher 510 communicates with the shared memory module via a memory interface multiplexer 520 to allocate a memory buffer in the shared memory for storing the result. The sub-operation launcher 510 can also be configured to allocate the output storage buffer in an area of the shared memory that is easily accessible to the processor cluster that is expected to perform the downstream sub-operation that relies on the output. For example, if the sub-operation launcher 510 has access to data that indicates that a processor cluster 1 will be performing a downstream sub-operation on the result of a current sub-operation, then the sub-operation launcher 510 can attempt to allocate the output buffer in a portion of the shared memory to which processor cluster 1 has fast read access and the current processor cluster 502 has write access.

Figure 6:
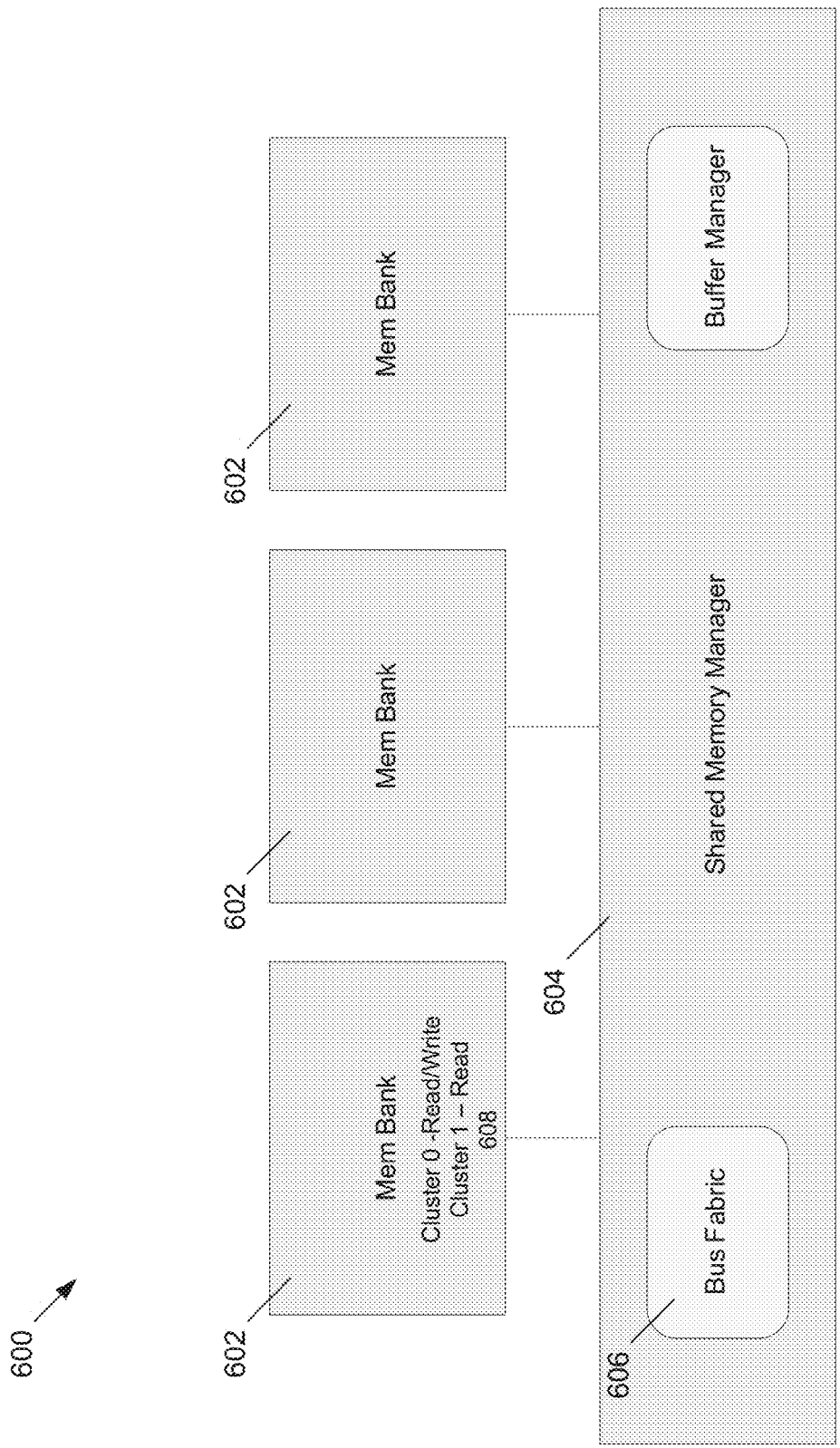
FIG. 6 is a block diagram depicting a shared memory configured to store sub-operation results from multiple processor clusters.

FIG. 6 is a block diagram depicting a shared memory configured to store sub-operation results from multiple processor clusters. The shared memory 600 includes a plurality of memory banks 602 and a shared memory manager 604 that includes a bus fabric 606. The bus fabric 606 allows different processor clusters to access different memory banks. Memory banks 602 can be optimized for access among processor clusters. For example, when one processor cluster regularly generates data for a second processor cluster, the bus fabric 606 may be appropriately optimized, and permissions for a memory bank can be adjusted accordingly. For example, as depicted at 608, where cluster 0 regularly produces output data that is consumed by sub-operations executing at cluster 1, a first memory bank has its permissions set so that cluster 0 has read/write access to that memory bank, while cluster 1 has read access via a fast bus fabric path for accessing data in that memory bank.

Figure 7:
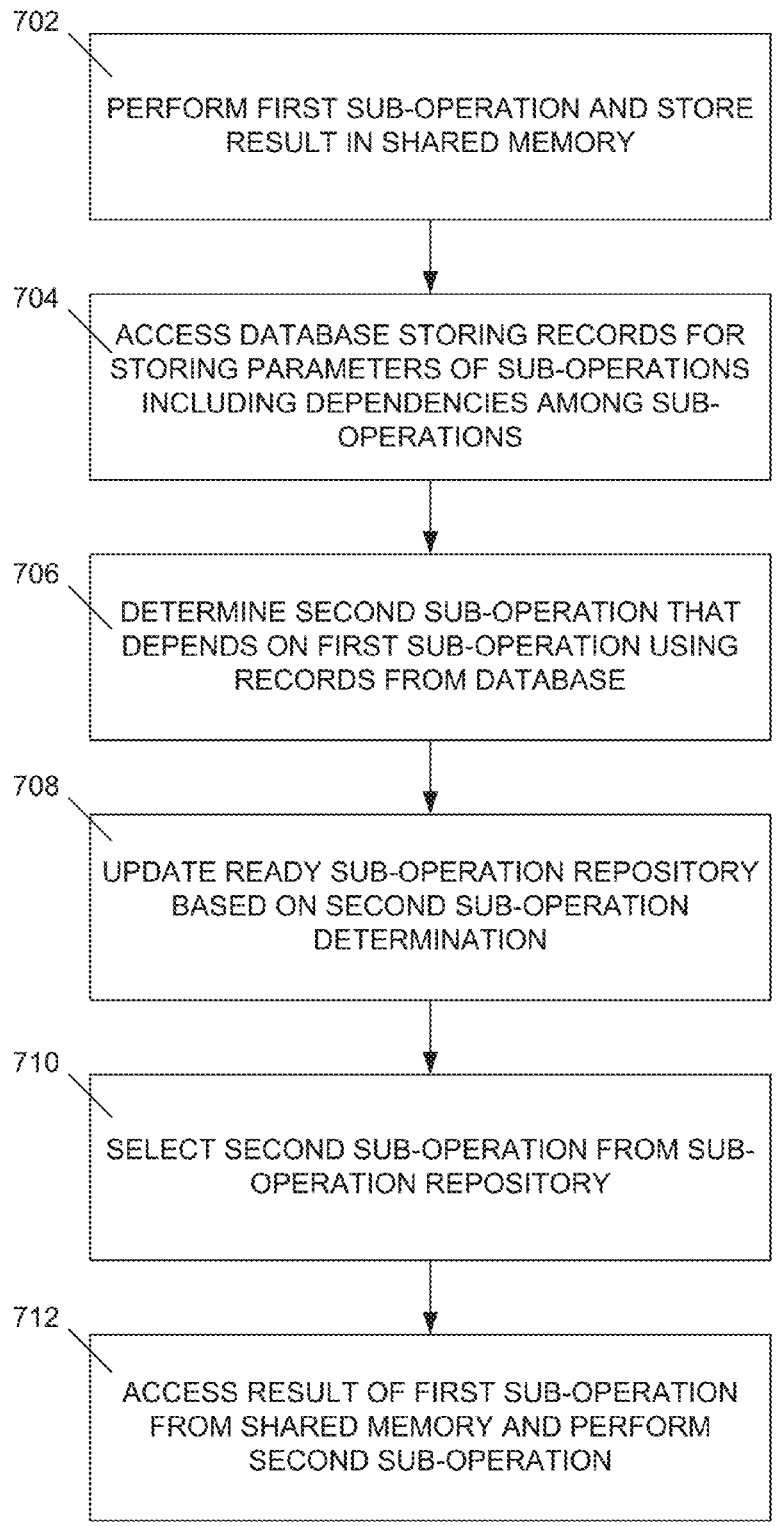
FIG. 7 is a flow diagram depicting a computer-implemented method of executing multiple processes that share common sub-operations.

FIG. 7 is a flow diagram depicting a computer-implemented method of executing multiple processes that share common sub-operations. At 702, a first sub-operation of a first process is performed using a first processor of a plurality of processors in a first processor cluster and storing a result of the first sub-operation in a shared memory. At 704, a database configured to store records containing parameters of sub-operations associated with the first process and sub-operations associated with the second process is accessed, the sub-operations associated with the first process sharing a common sub-operation with the sub-operations associated with the second process, the records further storing dependencies among sub-operations. At 706, a second sub-operation is determined that depends on the first sub-operation using records from the database, the second sub-operation being configured to use the result of the first sub-operation as an input. At 708, a ready sub-operation repository is updated based on the determined second sub-operation, the ready sub-operation repository being configured to identify sub-operations that are ready to be performed. At 710, the second sub-operation is selected from the ready sub-operation repository and assigning the second sub-operation to one of the plurality of processors in the first processor cluster. At 712, the result of the first sub-operation is accessed from the shared memory, and the second sub-operation is performed using the assigned processor and the accessed result.

This application uses examples to illustrate the invention. The patentable scope of the invention includes other examples.

It is claimed:

1. A system for executing a process that includes a plurality of sub-operations, the system comprising:
    a shared memory;
    a cluster-to-cluster communication channel;
    a plurality of processor clusters that are together capable of executing the process, wherein each respective cluster includes:
        a group of processors of a specific class different from classes of processors of other processor clusters;
        a database configured to store, for each respective sub-operation, of the plurality of sub-operations, that the respective cluster is assigned to execute,
        an identification of classes of processors that are capable of executing the respective sub-operation,
        an identification of at least one downstream sub-operation comprising another sub-operation, of the plurality of sub-operations, that is configured to input data that is output by the respective sub-operation,
        an identification of whether the respective sub-operation is ready to be performed, based on completion of all sub-operations to which the respective sub-operation is a downstream sub-operation, and
        an expiry time threshold;
    a processor assigner configured to
        select a ready first sub-operation from the ready sub-operations,
        identify a processor, from among the processors of the respective cluster, that is of a class that is identified in the respective cluster's database as capable of executing the selected ready first sub-operation,
        assign the selected ready first sub-operation to the identified processor to execute the selected ready first sub-operation, and store, in the shared memory, results of execution of the first sub-operation;
    a downstream cluster processor assigner configured to,
        identify a sub-operation, of the plurality of sub-operations, that is a downstream sub-operation of the executed first sub-operation,
        identify a cluster, of the plurality of clusters, that includes a processor that is of a class that is capable of executing the downstream sub-operation and that is different from the cluster that executed the first sub-operation, and
        assign the downstream sub-operation through the cluster-to-cluster communication channel to the identified cluster, for the identified cluster to execute the downstream sub-operation accessing the results of first sub-operation from the shared memory; and
    a processor re-assigner configured to, in response to a ready sub-operation having remained unexecuted in the respective cluster beyond the expiry time threshold, re-assign the ready sub-operation for execution to another processor cluster that includes a processor that is of a class that is capable of executing the ready sub-operation.

2. The system of claim 1, wherein in a first cluster from among the processor clusters, the processors of the specific type class differ in terms of protocol they are capable of functioning with.

3. The system of claim 2, wherein the protocols, in terms of which the processors differ, include 802.11 communication protocol, Bluetooth communication protocol and a long term evolution (LTE) communication protocol.

4. The system of claim 1, wherein the clusters include a first cluster, a second cluster and a third cluster in which the specific class is respectively for analog-to-digital conversion, signal processing, and forward error correction.

5. The system of claim 1, wherein identifying a cluster that includes a processor that is of a class that is capable of executing the downstream sub-operation is at least partially based on the processor clusters' respective loads.

6. The system of claim 1, wherein the sub-operation-ready database identifies which of the sub-operations have incomplete input data available, based on completion of at least one, but not all, sub-operations that are identified in the database as outputting data that is input by the respective sub-operation.

7. The system of claim 1, wherein, in a first cluster from among the processor clusters, at least one of the processors is not capable of performing at least one of the sub-operations.

8. The system of claim 1, wherein the database is structured to:
    include, for each respective sub-operation, exactly two fields for storing identifications of downstream sub-operations that input data that is output by the respective sub-operation,
    if the respective sub-operation has only two downstream sub-operations, then store identifications of those two destination sub-operation in the two fields, and
    if the respective sub-operation has more than two downstream sub-operations, then include a pointer address, in place of one of the two fields, that points to a sub-field record that stores identifications of additional downstream sub-operations.

9. A method performed by a respective cluster from among a plurality of processor clusters that are together capable of executing a process, wherein the process comprises a plurality of sub-operations, and each of the processor clusters includes a group of processors, the method comprising:

storing, in a database of the respective cluster, for each respective sub-operation of the plurality of sub-operations, that the respective cluster is assigned to execute,
an identification of classes of processors that are capable of executing the respective sub-operation, and
an identification of at least one downstream sub-operation comprising another sub-operation, of the process, that is configured to input data that is output by the respective sub-operation,
an identification of whether the respective sub-operation is ready to be performed, based on completion of all sub-operations to which the respective sub-operation is a downstream sub-operation,
an expiry time threshold;

selecting a ready first sub-operation from the ready sub-operations, identifying a processor, from among the processors of the respective cluster, that is of a class that is identified in the respective cluster's database as capable of executing the selected ready first sub-operation;

assigning the selected ready first sub-operation to the identified processor for execution;

executing, by the identified processor, the selected first sub-operation and storing results of the first sub-operation in a shared memory;

identifying a sub-operation, of the plurality of sub-operations, that is a downstream sub-operation of the executed first sub-operation;

identifying a cluster, of the plurality of clusters, that includes a processor that is of a class that is capable of executing the downstream sub-operation and that is different from the cluster that executed the first sub-operation;

assigning the downstream sub-operation through the cluster-to-cluster communication channel to the identified cluster for execution;

executing, by the identified cluster, the downstream sub-operation accessing the results of first sub-operation from the shared memory; and in response to a ready sub-operation having remained unexecuted in the respective cluster beyond the expiry time threshold, re-assigning the ready sub-operation, for execution, to another processor cluster that includes a processor that is of a class that is capable of executing the ready sub-operation;

wherein the processors of the respective cluster are of a specific class different from classes of processors of other clusters of the plurality of processor clusters.

10. The method of claim 9, wherein in the respective cluster, the processors of the specific class differ in terms of protocol they are capable of functioning with.

11. The method of claim 10, wherein the protocols, in terms of which the processors differ, include 802.11 communication protocol, Bluetooth communication protocol and a long term evolution (LTE) communication protocol.

12. The method of claim 10, wherein:
in the respective cluster, the specific class is for analog-to-digital conversion,
in another of the processor clusters, the specific class is for signal processing, and
in yet another of the processor clusters, the specific class is for forward error correction.

13. The method of claim 9, wherein the determining of which of the clusters to assign, to execute the ready sub-operation, is at least partially based on the processor clusters' respective loads.

14. The method of claim 9, further comprising:
storing, by the respective cluster, an identification of which of the sub-operations have incomplete input data available, based on completion of at least one, but not all, sub-operations that are identified in the respective cluster's database as outputting data that is input by the respective sub-operation.

15. The method of claim 9, wherein, in the respective cluster, at least one of the processors is not capable of performing at least one of the sub-operations.

16. The method of claim 9, further comprising:
the database including, for each respective sub-operation, exactly two fields for storing identifications of downstream sub-operations;
if the respective sub-operation has only two downstream sub-operations, then the database storing identifications of those two destination sub-operation in the two fields; and
if the respective sub-operation has more than two downstream sub-operations, then the database including a pointer address, in place of one of the two fields, that points to a sub-field record that stores identifications of additional downstream sub-operations.

17. A system comprising:
a cluster-to-cluster communication channel;
a plurality of processor clusters that are together capable of executing a process that includes a plurality of sub-operations, wherein each respective cluster includes:
a group of processors that includes a processor that is of a class different from classes of processors of other clusters;
a database configured to store, for each respective sub-operation, of the plurality of sub-operations, that the respective cluster is assigned to execute,
an identification of classes of processors that are capable of executing the respective sub-operation,
an identification of whether the respective sub-operation is ready to be performed, based on completion of all sub-operations to which the respective sub-operation is a downstream sub-operation, and
an expiry time threshold;
a processor assigner configured to assign a ready first sub-operation, from among the ready sub-operations, to a processor, from among the processors of the respective cluster, that includes a processor that is of a class that is capable of executing the ready sub-operation, to execute the first sub-operation; and
a downstream cluster processor assigner configured to,
identify a sub-operation of the plurality of sub-operations, that is a downstream sub-operation of the executed first sub-operation,
identify a cluster, of the plurality of clusters that is capable of executing the downstream sub-operation and that is different from the cluster that executed the first sub-operation and assign the downstream sub-operation through the cluster to cluster communication channel to the identified cluster to execute the downstream sub-operation; and
a processor re-assigner configured to, in response to a ready sub-operation having remained unexecuted in the respective cluster beyond the expiry time threshold, re-assign the ready sub-operation for execution to another processor cluster that includes a processor that is of a class that is capable of executing the ready sub-operation.

18. The system of claim 17, wherein the database is structured to:
   include, for each respective sub-operation, exactly two fields for storing identifications of downstream sub-operations that input data that is output by the respective sub-operation,
   if the respective sub-operation has only two downstream sub-operations, then store identifications of those two destination sub-operation in the two fields, and
   if the respective sub-operation has more than two downstream sub-operations, then include a pointer address, in place of one of the two fields, that points to a sub-field record that stores identifications of additional downstream sub-operations.

19. The system of claim 17, wherein:
   the system further comprises a shared memory and a cluster-to-cluster communication channel;
   the database is configured to store an identification of at least one downstream sub-operation comprising another sub-operation, of the plurality of sub-operations, that is configured to input data that is output by the respective sub-operation;
   the processor assigner is further configured to store, in the shared memory, results of execution of the first sub-operation; and
   the system further comprises a downstream cluster assigner configured to:
      identify a sub-operation, of the plurality of sub-operations, that is a downstream sub-operation of the executed first sub-operation,
      identify a cluster, of the plurality of clusters, that includes a processor that is of a class that is capable of executing the downstream sub-operation and that is different from the cluster that executed the first sub-operation, and
      assign the downstream sub-operation through the cluster-to-cluster communication channel to the identified cluster, for the identified cluster to execute the downstream sub-operation accessing the results of first sub-operation from the shared memory.

* * * * *